US010888861B2

(12) United States Patent
Reiter et al.

(10) Patent No.: US 10,888,861 B2
(45) Date of Patent: Jan. 12, 2021

(54) MICROFLUIDIC FLOW CONTROL AND DEVICE

(71) Applicant: STRATEC Consumables GmbH, Anif (AT)

(72) Inventors: Wolfgang Reiter, Salzburg (AT); Alfred Paris, Salzburg (AT); Daniel Horner, Anthering (AT); Thomas Umundum, Henndorf (AT); Thomas Buttinger, Bergheim (AT)

(73) Assignee: STRATEC Consumables Gmb, Anif (AT)

( * ) Notice: Subject to any disclaimer, the term of this patent is extended or adjusted under 35 U.S.C. 154(b) by 242 days.

(21) Appl. No.: 15/648,977

(22) Filed: Jul. 13, 2017

(65) Prior Publication Data
US 2018/0015469 A1  Jan. 18, 2018

(30) Foreign Application Priority Data

Jul. 13, 2016 (EP) ..................................... 16179324

(51) Int. Cl.
*B01L 3/00* (2006.01)
*F16K 99/00* (2006.01)
(Continued)

(52) U.S. Cl.
CPC ... *B01L 3/502738* (2013.01); *B01L 3/502707* (2013.01); *B32B 37/06* (2013.01); *B32B 37/10* (2013.01); *B32B 37/12* (2013.01); *B32B 38/0008* (2013.01); *F16K 99/0015* (2013.01); *F16K 99/0026* (2013.01); *B01L 9/527* (2013.01); *B01L 2300/0816* (2013.01);
(Continued)

(58) Field of Classification Search
CPC ........ B01L 3/502738; B01L 3/502707; B01L 2400/0633; B01L 2300/0887; B01L 2300/0874; B01L 2300/0816; B01L 9/527; B01L 2300/123; B01L 2400/0655; F16K 99/0026; F16K 99/0015; F16K 2099/008; B32B 38/0008; B32B 37/06; B32B 37/10; B32B 37/12
See application file for complete search history.

(56) References Cited

U.S. PATENT DOCUMENTS 10,029,255 B2 *  7/2018  Kitamoto .......... B01L 3/502738
2010/0126927 A1 *  5/2010  Blankenstein .... B01L 3/502707
                                                    210/418
2011/0305607 A1 * 12/2011  Jung ................. B01L 3/502738
                                                    422/502

FOREIGN PATENT DOCUMENTS

DE    102006059459 A1    7/2008
WO       2008026714       3/2008
(Continued)

*Primary Examiner* — Dennis White
(74) *Attorney, Agent, or Firm* — 24IP Law Group USA, PLLC; Timothy Dewitt

(57) ABSTRACT

A microfluidic flow controller comprising a substrate having formations defining two or more fluid channels having channel fluid ports which are open at an outer surface of the substrate; and a flexible layer having formations defining a fluid channel which, when the flexible layer is positioned over the substrate so as to cover at least the channel fluid ports, provides a fluid communication path between the channel fluid ports but which, when a force is applied to press the flexible layer towards the substrate, deforms so as to inhibit fluid communication between the channel fluid ports.

19 Claims, 11 Drawing Sheets

(51) Int. Cl.
  *B32B 37/06* (2006.01)
  *B32B 37/10* (2006.01)
  *B32B 37/12* (2006.01)
  *B32B 38/00* (2006.01)
  *B01L 9/00* (2006.01)

(52) U.S. Cl.
  CPC ............... *B01L 2300/0874* (2013.01); *B01L 2300/0887* (2013.01); *B01L 2300/123* (2013.01); *B01L 2400/0633* (2013.01); *B01L 2400/0655* (2013.01); *F16K 2099/008* (2013.01)

(56) References Cited

FOREIGN PATENT DOCUMENTS

| WO | 2013064683 | | 5/2013 | | |
| WO | WO-2013064683 | A1 * | 5/2013 | ........ | B01L 3/502738 |
| WO | 2015119290 | | 8/2015 | | |
| WO | WO-2015119290 | A1 * | 8/2015 | ........ | B01L 3/502738 |

* cited by examiner

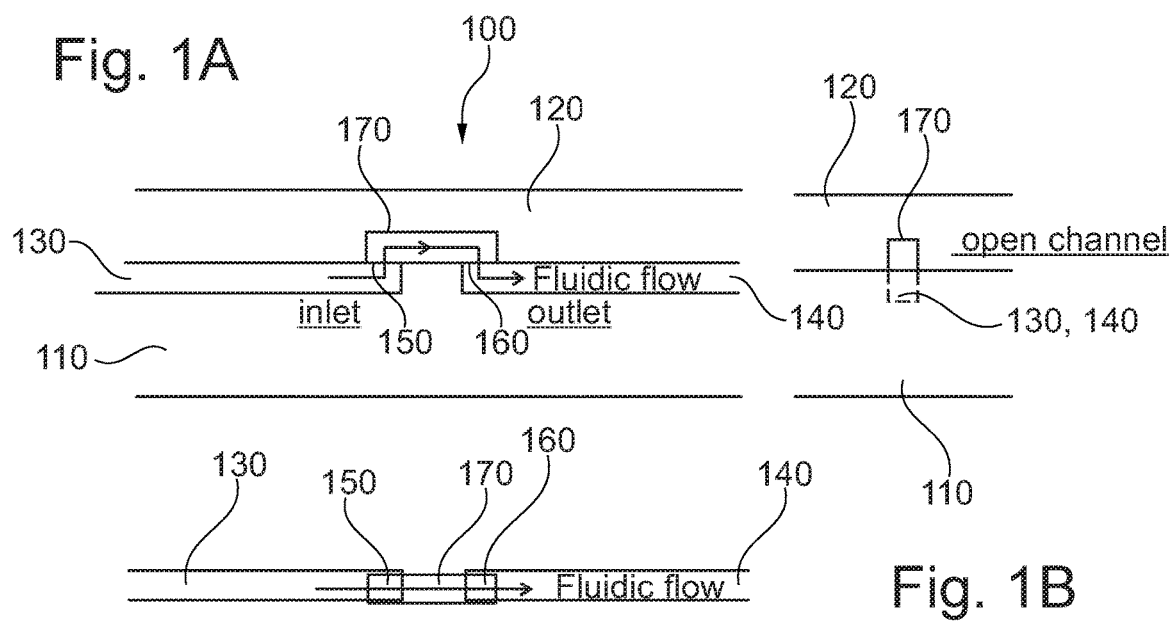
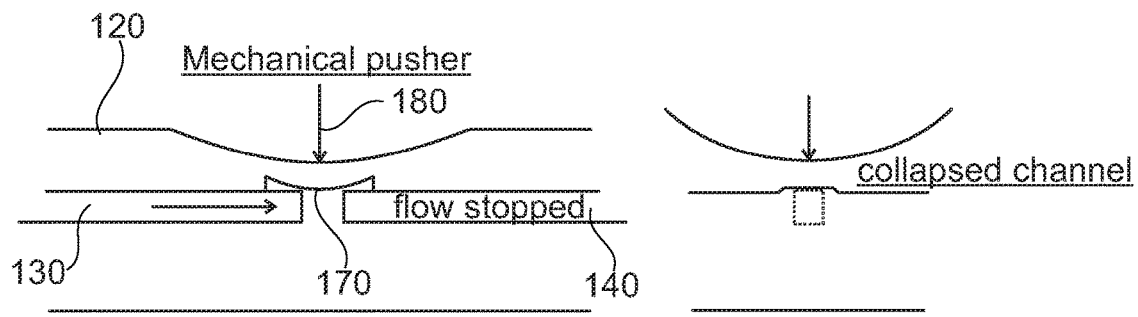
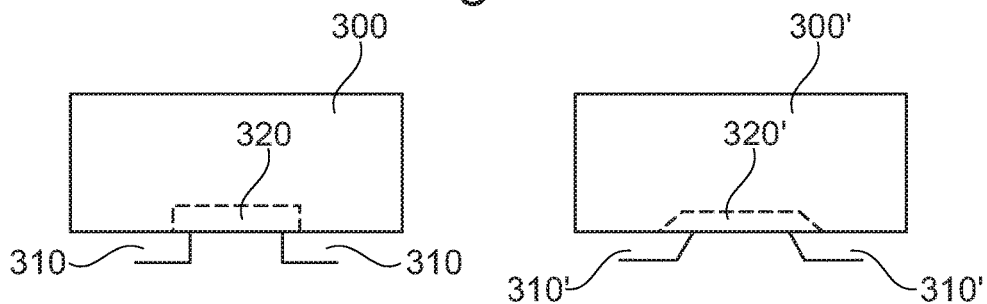

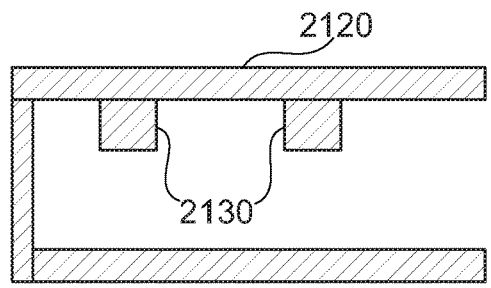
Fig. 22
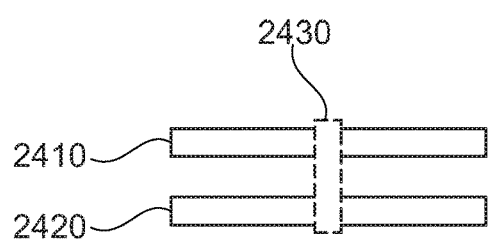
Fig. 24A
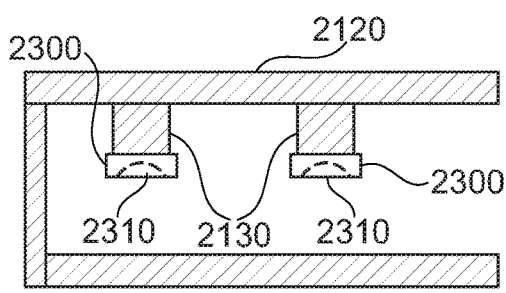
Fig. 23
Fig. 24B
Fig. 24C
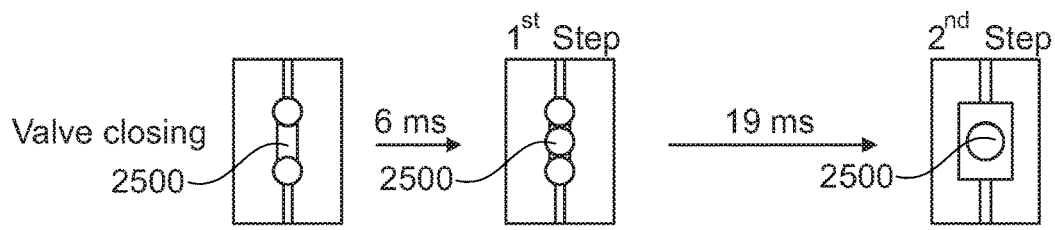
Fig. 25
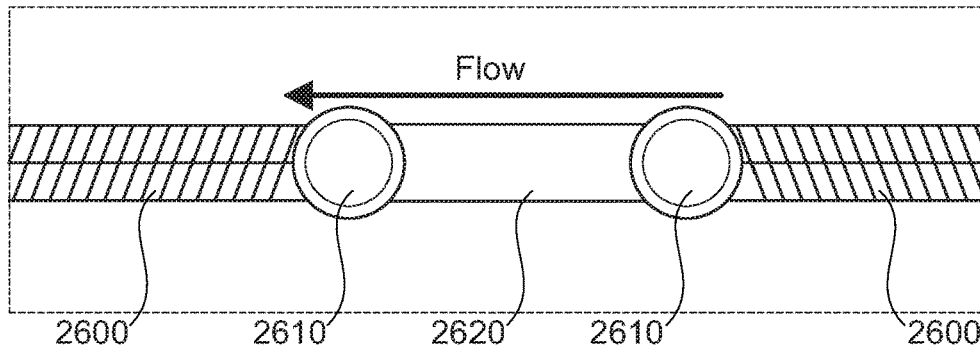
Fig. 26

MICROFLUIDIC FLOW CONTROL AND DEVICE

CROSS-REFERENCE TO RELATED APPLICATIONS

The present application claims priority of European Patent Application No. EP 16 179 324.5 filed on Jul. 13, 2016. The aforementioned application is hereby incorporated by reference in its entirety.

BACKGROUND OF THE INVENTION

Field of the Invention

This disclosure relates to microfluidic flow control and to microfluidic devices.

Brief Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Microfluidic devices are used for fluid manipulation at a small scale, typically characterized by fluid volumes measured in μL (microliters). In a microfluidic device, fluids are manipulated within microfluidic channels or other formations, typically being formations provided in a structure of one or more layers by an etching, moulding, laser cutting, milling, hot embossing or lithographic process.

There is a need to control fluid flow within such a microfluidic device.

BRIEF SUMMARY OF THE INVENTION

This disclosure provides a microfluidic flow controller comprising a substrate having formations defining two or more substrate fluid channels having channel fluid ports which are open at an outer surface of the substrate; and a flexible layer having formations defining a flexible fluid channel which, when the flexible layer is positioned over the substrate so as to cover at least the channel fluid ports, provides a fluid communication path between the channel fluid ports but which, when a force is applied to press the flexible layer towards the substrate, deforms so as to inhibit fluid communication between the channel fluid ports.

In a preferred embodiment, the present invention is a microfluidic flow controller. The controller comprises a substrate having formations defining two or more substrate fluid channels having channel fluid ports which are open at an outer surface of the substrate and a flexible layer having formations defining a flexible fluid channel which, when the flexible layer is positioned over the substrate so as to cover at least the channel fluid ports, provides a fluid communication path between the channel fluid ports but which, when a force is applied to press the flexible layer towards the substrate, deforms so as to inhibit fluid communication between the channel fluid ports. The flexible layer may be substantially the same size as the surface of the substrate, may comprise a patch having a smaller size than that of the surface of the substrate, or may comprise one or more control formations positioned with respect to the flexible fluid channel so that when a force is applied to the one or more control formations, the flexible fluid channel is deformed. The one or more control formations are configured so that application of an external force to an activation area of the one or more control formations causes deformation of the flexible fluid channel, the activation area being wider than the width of the flexible fluid channel. In another embodiment, the flexible layer comprises one or more indentations defining the flexible fluid channel. The one or more indentations and/or at least one of the channel fluid ports may be chamfered.

In another embodiment at least one of the channel fluid ports is the end of a via which connects that channel fluid port to a respective substrate fluid channel below a surface of the substrate.

In another embodiment, at least one of the channels is open to the substrate surface.

In another embodiment, at least one channel fluid port is an end of the respective channel.

The flexible layer may be formed of elastomer, silicone or natural or synthetic rubber.

In another embodiment, the substrate is formed of one or more of: a polymeric material, glass, quartz, silicon nitride, silicon oxide, polyethers, polyesters, polyamides, polyimides, polyvinylchlorides, polyacrylates, their modifications, derivatives and copolymers.

In another embodiment, the substrate is formed of one of the list consisting of: acrylnitril-butadien-styrole (ABS), cyclo-olefin-polymers and copolymers (COC/COP), Polymethylene-methacrylate (PMMA), Polycarbonate (PC), Polystyrole (PS), Polypropylene (PP), Polyvinylchloride (PVC), Polyamide (PA), Polyethylene (PE), Polyethylene-terephthalate (PET), Polytetrafluor-ethylene (PTFE), Polyoxymethylene (POM), Thermoplastic elastomers (TPE), thermoplastic polyurethane (TPU), Polyimide (PI), Polyetherether-ketone (PEEK), Polylactic acid (PLA), and polymethylpentene (PMP).

In another embodiment, the flexible layer is attached to the substrate by an attachment selected from the list consisting of: (i) bonding, (ii) welding, (iii) gluing and (iv) clamping.

In another embodiment, a cross-sectional dimension of the flexible fluid channel is selected from the list consisting of: (i) less than 1 mm, (ii) less than 500 pm, (iii) less than 200 pm, and (iv) less than 50 pm.

In another embodiment, the invention is a microfluidic device. The device has one or more microfluidic flow controllers of the embodiments discussed above.

In another embodiment, the present invention is a microfluidic system. The system has a support to receive a microfluidic device as described above one or more actuators configured with respect to the position which the microfluidic device would adopt when held by the support, to provide pressure to press the flexible layer of the microfluidic device towards the substrate of the microfluidic device so as to deform the flexible fluid channel defined by the flexible layer. The microfluidic system may have a microfluidic device as described above.

In another embodiment, the present invention is a method of manufacturing a microfluidic flow controller. The method comprises fabricating a substrate having formations defining two or more substrate fluid channels having channel fluid ports which are open at an outer surface of the substrate and positioning a flexible layer over the substrate. The flexible layer has formations defining a fluid channel so that, when the flexible layer is positioned over the substrate so as to cover at least the channel fluid ports, the flexible fluid channel provides a fluid communication path between the channel fluid ports but, when a force is applied to press the flexible layer towards the substrate, the flexible fluid channel deforms so as to inhibit fluid communication between the channel fluid ports. The method may further comprise fabricating the flexible layer by injection moulding or casting. The method may further comprise attaching the flexible layer to the substrate by an attachment selected from the list consisting of: (i) bonding, (ii) welding, (iii) gluing, and (iv) clamping. The bonding step may comprise bonding the flexible layer to the substrate by plasma activated bonding.

Further respective aspects and features are defined in the appended claims.

It is to be understood that both the foregoing general description and the following detailed description are exemplary, but not restrictive of, the present disclosure.

BRIEF DESCRIPTION OF THE DRAWINGS

A more complete appreciation of the disclosure and many of the attendant advantages thereof will be readily obtained as the same becomes better understood by reference to the following detailed description of embodiments, when considered in connection with the accompanying drawings, wherein:

FIGS. 1A, 1B, 1C, 2A, 2B and 2C are schematic diagrams illustrating the operation of a microfluidic flow controller;

FIGS. 3A and 3B are schematic cross sections of channels within a flexible layer of the flow controller of FIGS. 1A-C and 2A-C;

FIGS. 21, 22 and 23 schematically illustrate a microfluidic system;

FIGS. 24A-C schematically illustrate another configuration; and

FIGS. 25 and 26 are photographs of an example flow controller in use.

DETAILED DESCRIPTION OF THE INVENTION

Figure 4A:
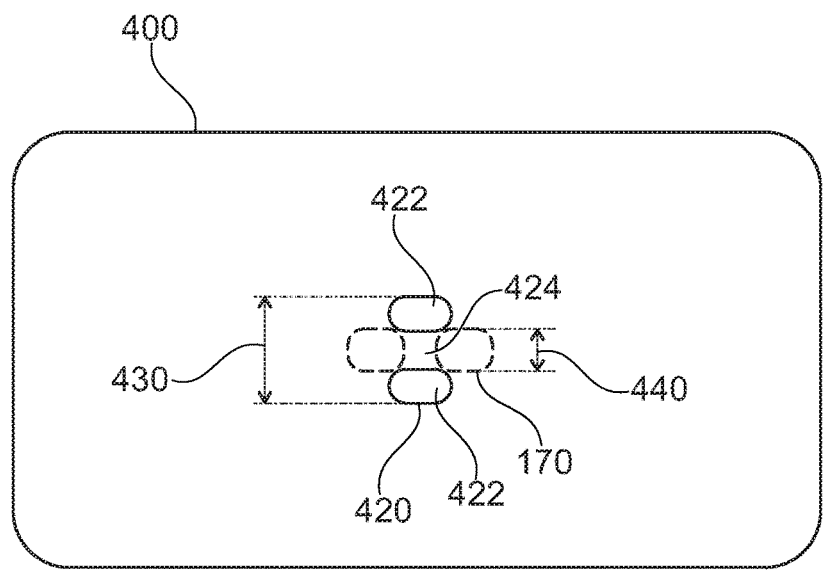
FIGS. 4A-C and FIG. 5 schematically illustrate a flexible layer.

FIGS. 1A-C and 2A-C are schematic diagrams illustrating the operation of a microfluidic flow controller. The flow controller in is shown in cross-section in FIGS. 1A and 2A, cross-sectional side elevation in FIGS. 1B and 2B and a partial cross-sectional plan view in FIGS. 1A and 2C. The three representations in each drawing are laterally aligned with one another.

Referring to FIGS. 1A-C, a microfluidic flow controller (for example, a valve) 100 is formed by a portion of a substrate 110 and a flexible layer 120. The substrate has formations defining two or more substrate fluid channels 130, 140 having channel ends 150, 160 which are open at an upper surface (as drawn) of the substrate. This provides an example of a microfluidic flow controller in which at least one of the channels is open to the substrate surface, and an example of a microfluidic flow controller in which at least one channel fluid port is an end of the respective channel. The channels may have a width and/or depth of (for example) 10 μm to 1 mm. The flexible layer 120 has formations defining a flexible fluid channel 170. It may be, for example, bonded to the substrate. An example arrangement has a flexible fluid channel with a cross-sectional area of 0.024 mm$^2$, a channel length of 1.35 mm and a total internal volume of just 30 nanoliters. More generally, a cross-sectional dimension of the flexible fluid channel is selected from the list consisting of: (i) less than 1 mm, (ii) less than 500 μm, (iii) less than 200 μm, and (iv) less than 50 μm. Such small dimensions can help to provide a small dead volume. An example cross section of a flexible fluid channel will be described below with reference to FIG. 9.

The arrangement of FIGS. 1A, 1B and 1C show the microfluidic flow controller in an "open" configuration so that fluid may flow between the channels 130 and 140, and FIGS. 2A, 2B and 2C show the microfluidic flow controller in a "closed" configuration so that fluid flow is inhibited between the channels 130, 140.

The substrate 110 is a generally rigid material, such as a plastic or glass type of material, in which microfluidic formations including the channels under discussion are provided by an etching, stamping, embossing or other process. Specific examples of suitable materials will be discussed in detail below. In contrast, the flexible layer 120 is formed of a flexible material such as an elastomeric material which can, at least to an extent, deform under application of external force. Specific examples of suitable materials will be discussed in detail below. The flexible layer could be, for example, injection moulded.

In this way, the flexible layer can be used as follows. The flexible fluid channel 170 is positioned over the substrate so as to cover at least the channel ends 150, 160, which are examples of channel fluid ports. Other examples of channel fluid ports will be discussed below. The flexible fluid channel 170 provides a fluid communication path between the channel ends but, when a force is applied to press the flexible layer towards the substrate, the flexible fluid channel deforms so as to inhibit fluid communication between the channel ends.

The flexible layer provides a cover for at least some of the remaining portions of the channels 130, 140.

So, referring to FIGS. 1A, 1B and 1C, the flow controller is "open" and fluid may flow along one of the channels and through its channel end into the flexible fluid channel 170 and from there, through the channel end of the other channel and then along the second channel. So, the flexible fluid channel provides a fluid flow path in this configuration. This can be seen in the cross-sectional drawing of FIG. 1C, where it is noted that the example fluid flow from left to right is merely for the purposes of illustration; fluid flow could be in either direction.

Referring to FIGS. 2A, 2B and 2C, a mechanical force shown schematically by an arrow 180 is applied to the flexible layer so as to deform the flexible fluid channel 170 such that fluid flow between the channels 130, 140 is inhibited.

In the example of FIGS. 2A, 2B and 2C, the fluid flow is substantially (or indeed, in some examples, completely) stopped. It will be appreciated that in other examples the operation of the microfluidic flow controller does not have to be a binary "on/off" control but instead the amount of restriction in the fluid path from the channel 130 to the channel 140 could be varied between fully on and fully off.

Note that the flexible fluid channel 170 is formed, for example, as one or more indentations or recesses (such as an elongate recess of the type shown in the present drawings) in the flexible layer itself, and the flexible layer is deformed by the application of the external force 180. So, when the flow controller is "open" fluid flow is diverted along the channel formed by the one or more indentations or recesses in the flexible layer 120. Fluid flow is inhibited by deforming the flexible layer so as to close (or at least partially close) the flexible fluid channel 170 formed within the flexible layer 120. In examples, the flexible fluid channel is (from the point of view of the flexible layer) an open channel so that for at least part of the fluid flow path through the flexible fluid channel, one or more sides of the flexible fluid channel are provided by the surface of the substrate (such as a part of the surface between the channel fluid ports). However, in other examples, the flexible fluid channel could be a closed channel enclosed within the flexible layer. In further embodiments, more than one side of the flexible fluid channel could be provided by substrate (for example, rigid) formations. For example, at least a part of one or more sides of the flexible fluid channel could be provided by formations upstanding from the substrate surface.

In the schematic example of FIGS. 1A, 1B and 1C, the fluid follows a path from the channel 130 to the channel 140 involving multiple right angle turns. In order to alleviate any resistance to fluid flow which these right angle turns may impart in the example arrangements, one or both of: (i) the ends of the flexible fluid channel 170; and (ii) the channel ends 150, 160 are chamfered. Here, the term chamfering encompasses any shaping which tends to round off, smooth or otherwise lessen the abrupt right angle turns shown in FIGS. 1A, 1B and 1C. For example, the ends of the flexible fluid channel and/or the channel ends themselves could be angled (as shown schematically in FIG. 3B, in comparison with the right angles in FIG. 3A) so as to provide a diversion of the fluid flow (to pass through the flexible fluid channel 170) of less than 90 degrees. In FIGS. 3A and 3B, the flexible layer (or a part of it) is shown as item 300, 300'. Substrate channel ends 310, 310' connect to a flexible fluid channel 320, 320'. As an alternative to angling, the ends could be radiused or otherwise shaped so as to reduce the abrupt nature of the diversion of the fluid flow.

Figure 4C:
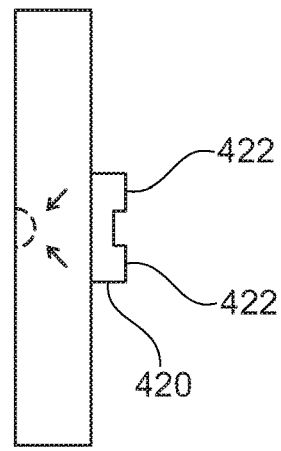
Figure 4B:
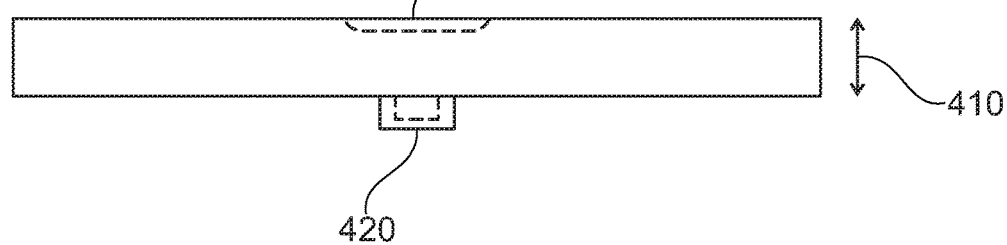
Figure 5:
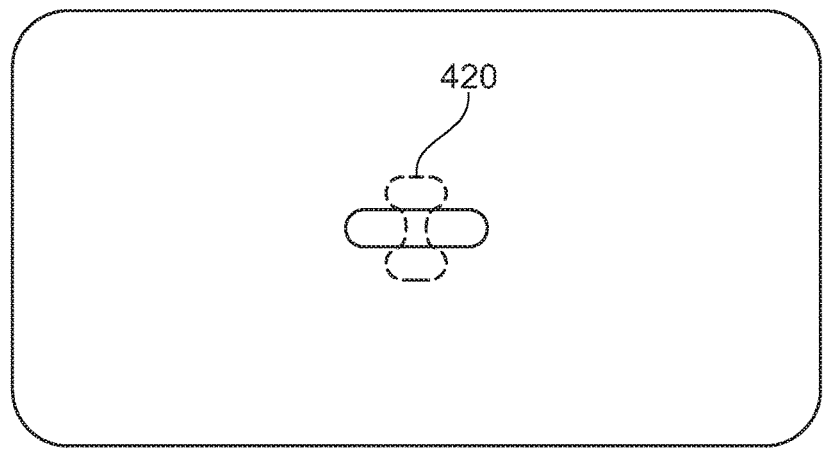

FIGS. 4A-4C and 5 schematically illustrate a flexible layer 400, shown in various views which are: plan view from above (FIG. 4A), side elevation (FIG. 4B), cross-sectional side view (FIG. 4C) and plan view from below (FIG. 5). In a thickness direction of the flexible layer 410, these various views show the flexible fluid channel 170 and one or more control formations 420. The control formations are positioned with respect to the flexible fluid channel so that when a force is applied to the one or more control formations, the flexible fluid channel is deformed as discussed above. In examples such as that shown in FIGS. 4A-4C and 5, the one or more control formations are configured so that application of an external force to an activation area of the one or more control formations causes deformation of the flexible fluid channel, the activation area being wider than the width of the flexible fluid channel. Referring to FIGS. 4A-4C, the activation area is basically anywhere on either of the lobes 422 or the central area 424 of the formation 420, so that the activation area has a width 430 which is wider than the width 440 of the flexible fluid channel 170. This greater width of the activation area allows for a partial relaxation of the positioning requirements of, for example, an external actuator used to provide the external force to close the flexible fluid channel (noting that the channel will tend to reopen upon removal of the external force because of its elastic behavior, or in other words that the flow controller of these examples is a normally open flow controller). This in turn can mean that cheaper or more tolerant assembly and/or components may be used in, for example, a microfluidic system including a device having one or more flow controllers of the type being described here.

In the specific example of FIG. 5, the twin lobed arrangement of the control formations 420 can provide efficient operation in that if an external actuator presses on the two lobes, they will tend to collapse the channel by directing the pushing force from two sides towards the channel, thereby potentially reducing the required force and allowing cheaper or less powerful or less power-consuming actuators to be used. In other examples, if pressure is applied to either of the two lobes 422, the shape of the control formations provides that the force applied to the control formations will tend to be directed towards deforming the flexible fluid channel disposed (in this example) centrally between the two lobes. Reference is made to the arrows in the side elevation of FIG. 4B.

The control formations may be moulded or otherwise fabricated with the rest of the flexible layer, or may be fixed to it later (for example, glued). They may be formed of the same material as the flexible layer or may be formed of another material; for example, a more rigid material than that used in the flexible layer.

Figure 6:
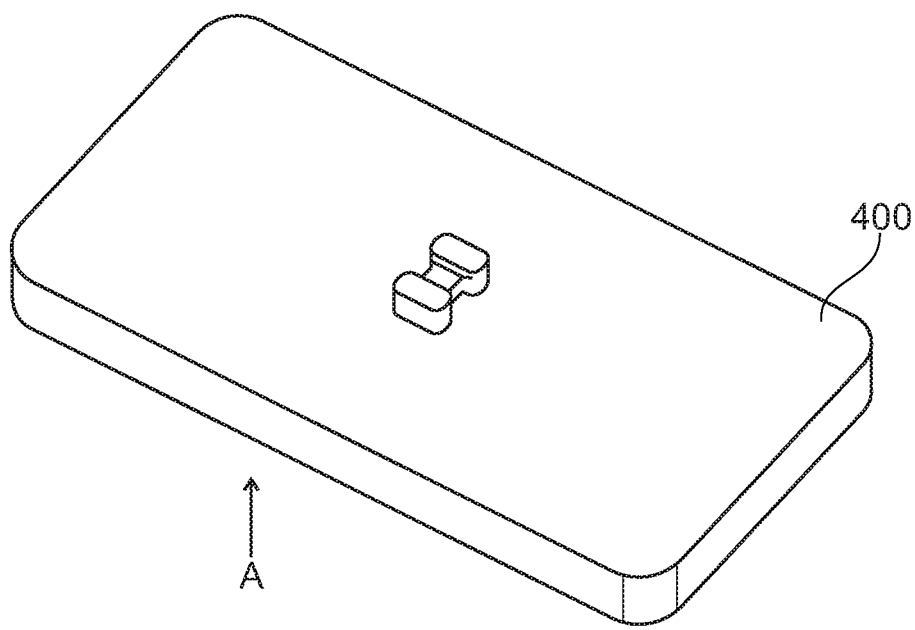
FIGS. 6 and 7 provide isometric views of a flexible layer.
Figure 7:
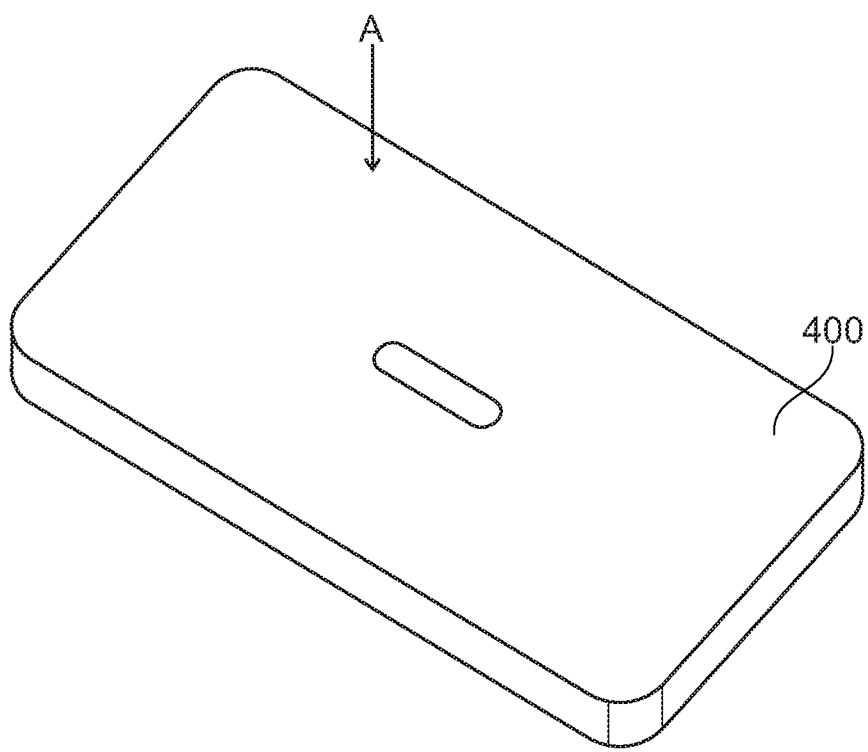
Figure 8A:
FIGS. 8A to 8L schematically illustrate control formations.
Figure 8B:
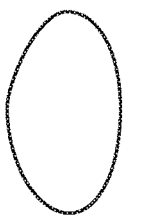
Figure 8C:
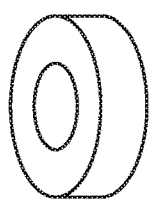
Figure 8D:
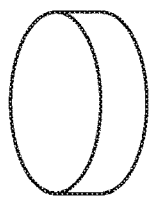
Figure 8E:
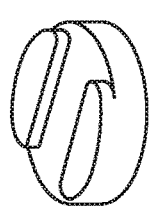
Figure 8F:
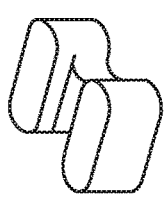

FIGS. 6 and 7 provide isometric (perspective) views of the flexible layer 400 of FIGS. 4A-4C and 5. In particular, FIG. 6 is an isometric upper view (where "upper" refers to a surface of the flexible layer 400 which does not contact the substrate 110) and FIG. 7 shows an isometric "lower" view of the same flexible layer 400, as seen in the direction A shown in FIG. 6.

FIGS. 8A to 8F schematically illustrate alternative examples of control formations. The control formations are shown on their own in FIGS. 8A to 8F, and in FIGS. 8G to 8L respectively they are shown when part of a flexible layer (either through being formed as part of the flexible layer or by being fabricated separately and fixed to the flexible layer, for example by gluing, welding or other processes). In each example, the control formations protrude from the upper (non-substrate-contacting) surface of the flexible layer in a similar manner to those shown in FIGS. 4A-4C. In all of these examples the control formations provide an activation area (such as the upper face of the control formations) which has a width greater than the width of the flexible fluid channel. However, other control formations not complying with this constraint could be used.

When the actuator/pusher hits the activation structure, it will be pressed into the elastomeric or flexible layer. As the activation structure is positioned exactly above the channel, the force is introduced at the right position to collapse the channel.

A useful shape of the activation structure depends on multiple parameters such as elasticity of the material for the elastomeric layer, thickness of the elastomeric layer and cross section of the microfluidic channel.

For some applications (if the shape of the actuator tip is selected carefully and if the alignment is accurate), such a flow controller may work without the need of an activation structure. For some applications, a simple pillar shape (round, rectangular of square) may be enough if the actuation pressure is high enough and the actuation timing (time to fully close or allow to reopen the channel) is not critical. Empirical tests have shown that a more complicated actuator shape (as shown in the drawings) gave improved performance compared to a simple pillar shape.

As discussed, actuation of the flow controller can be done by a mechanical pusher, which can be manually or automated operated. Any linear motion with adequate stroke (about same as total thickness of the elastomeric layer) may be applied. To aim towards reliable and efficient operation, there could be any appropriate mechanical shape of the elastomeric part and the pusher.

Such activation structure can be part of the elastomeric layer or part of the actuator. If it is part of the actuator, it needs to be positioned so as to be generally centered above the microfluidic channel.

If it is part of the elastomeric layer, the positioning of the actuator is not critical.

In examples, a flat surface of the actuator cap may hit the full top area of the activation structure. For example, in the case of a pusher structure of 1 mm diameter and a pusher base of 2 mm diameter, an offset of +/−0.5 mm is allowed.

The activation structure can be an integrated part of the elastomeric layer (monolithic) or can be mounted on top of the elastomeric layer (for example, glued).

Figure 9:
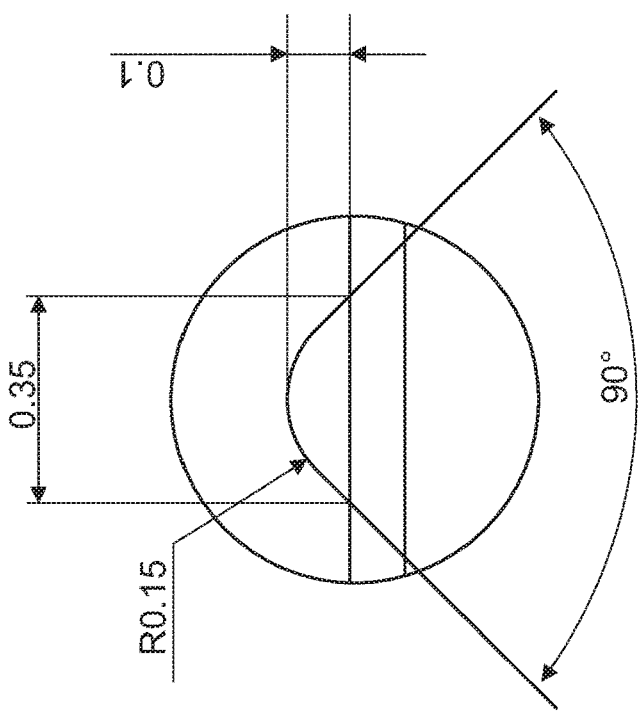
FIG. 9 schematically illustrates a cross section of a flexible fluid channel.
Figure 8G:
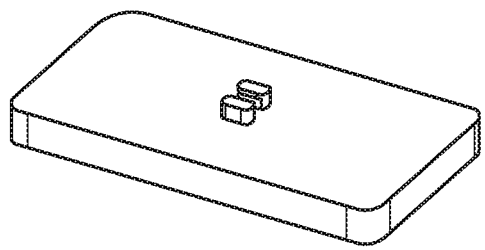
Figure 8H:
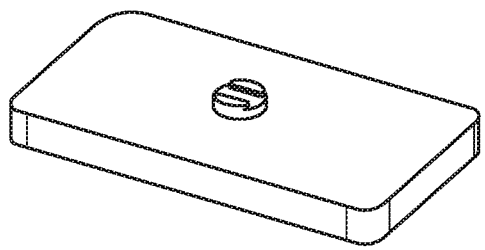
Figure 8I:
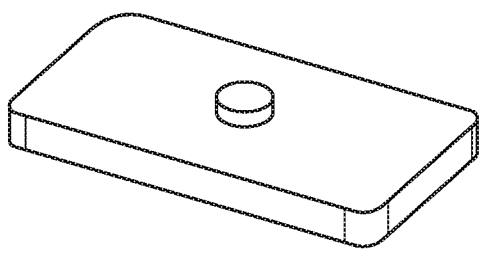
Figure 8J:
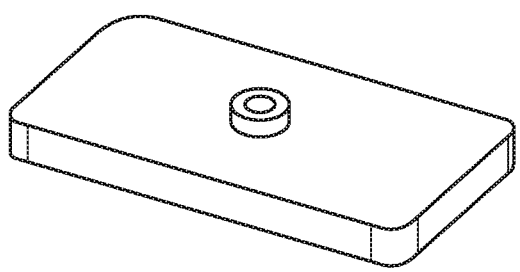
Figure 8K:
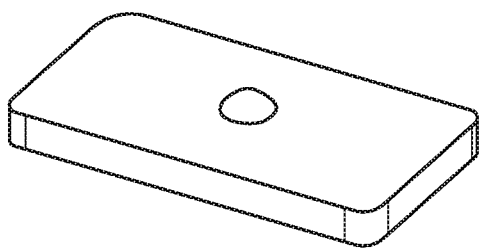
Figure 8L:
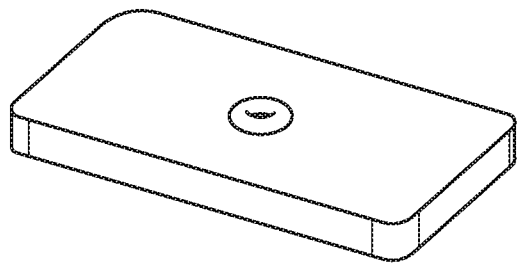

FIG. 9 schematically illustrates a cross section of a flexible fluid channel.

In examples, the flexible fluid channel shape is designed to meet the following main criteria: (a) required flow rate (direct relation to orifice), (b) allowable dead volumes (should be usually as small as possible for microfluidics), (c) to enable collapsing and sealing of the channel with low force, and/or (d) to enable quick and reliable full self-recovery of the channel after actuation.

A 45° draft angle of the flexible fluid channel side walls, as well as a height to base width ratio of 1:3.5 has been tested empirically as a useful configuration for collapsing and sealing of the channel with low force on the one hand and quick and reliable self-opening on the other hand.

If that ratio is changed to the direction of 1:<3.5, closing force will rise and perfect sealing may become more difficult. If the ratio is changed to the other direction (1:>3.5), opening speed and full recovery of channel cross section may become worse.

The dimensions of the elastomeric layer may be tuned to the dedicated channel size and the properties of the elastomer to ensure adequate functionality. The size of the elastomeric layer (or at least that portion containing the flexible fluid channel) can be basically any shape, but may depend on criteria such as: (a) channel dimension (length, width, . . . ), (b) to enable sufficient area for sealing (to allow proper bonding), (c) optionally to act as a cover layer for the channels of the microfluidic component, and/or (d) whether clustering of flow controllers is required.

The thickness of the elastomeric layer may depend on criteria such as: (a) channel height, (b) hardness of the elastomeric material, and/or (c) required switching performance (on/off-timing).

A ratio of channel height to body height of 1:7 has been demonstrated for good functionality for the material PDMS. A ratio of 1:>7 will increase closing force and a ratio of 1:<7 may slow opening speed and the ability for full recovery of channel cross section.

The flexible fluid channel volume is just defined by the flexible fluid channel cross section and the flexible fluid channel length.

An example mentioned above is a flow controller (valve) with a cross sectional area of 0.024 mm$^2$. At a channel length of 1.35 mm the flow controller just contains a total internal volume of 30 nl. By contrast, the internal volumes of commercial currently available microfluidic valves or flow controllers usually start at (for example) 1 ml, which is approximately 30× more.

As the channel is directly in the flow path and smaller than the inlet and outlet via of the microfluidic device, that solution does not generate any dead volume, or at least generates a very small dead volume. This alleviates the following risks: (a) that contents of the fluid (such as so-called pico-droplets) might stay uncontrollable within the flow controller, and (b) that air bubbles might stay within the flow controller which could be released uncontrollably.

Performance data of a prototype flow controller with 350 μm wide and 100 μm high flexible fluid channels are as follows: (a) Flow rate: 14.267 μl/h (at a pressure caused by a height difference of just 200 mm from inlet to outlet) based on: 75 mm flow distance in a tube with 0.58 mm inside diameter within 5 seconds, (b) approximate leakage rate at a fluid pressure of 2 bar was 15.852 μl/h based on: 1 mm flow distance within 1 min (at a cylinder pressure of 5 bar), (c) in a long term stability test, the flexible fluid channel reopened normally after 43 h of closing (air pressure to cylinder: 5 bar), and (d) in a long run test, there was no visible change in functionality after 37,800 on/off cycles based on keeping the flow controller under 1s on/off cycles for 21 hours.

Figure 11:
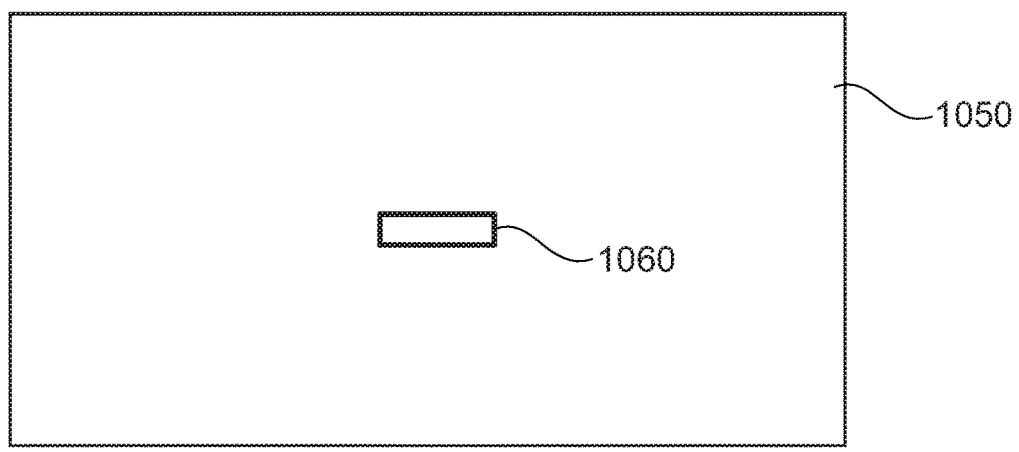
Figure 12:
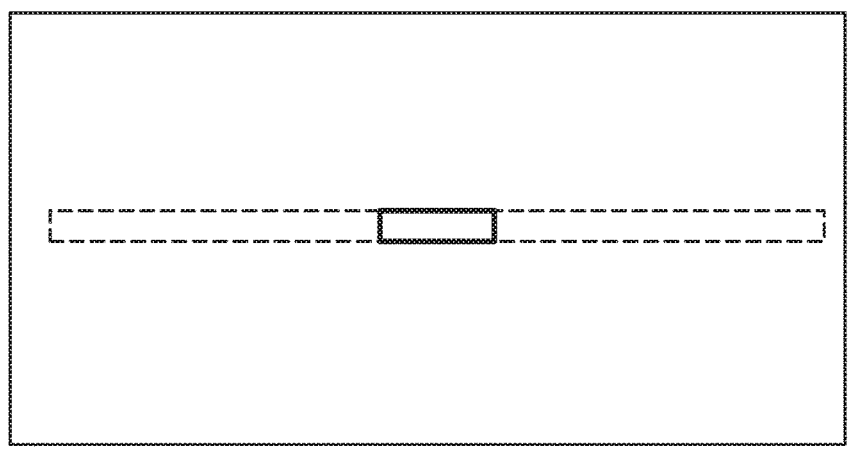
Figures 13A, 13B:
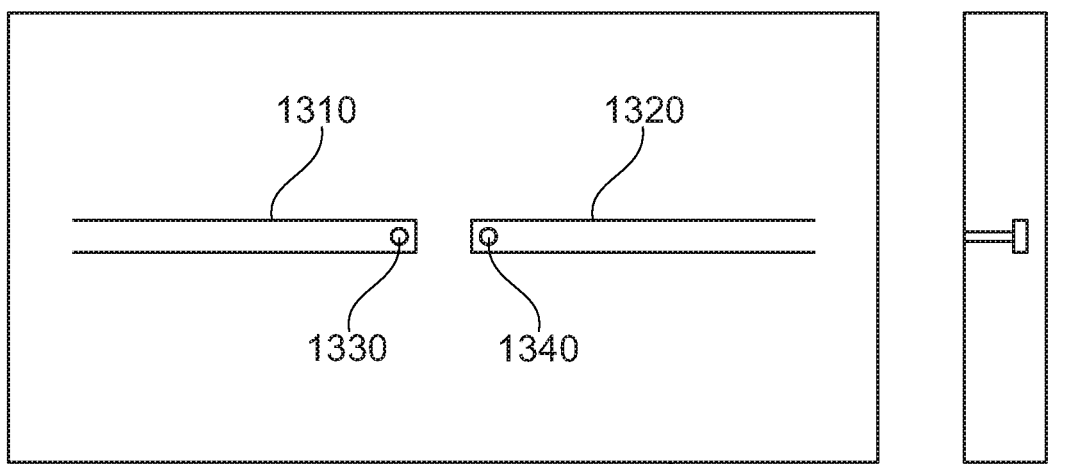
FIGS. 13A, 13B, 14 and 15 are similar to FIGS. 10 through 12 but using a flexible layer which does not cover the whole of the substrate.
Figure 14:
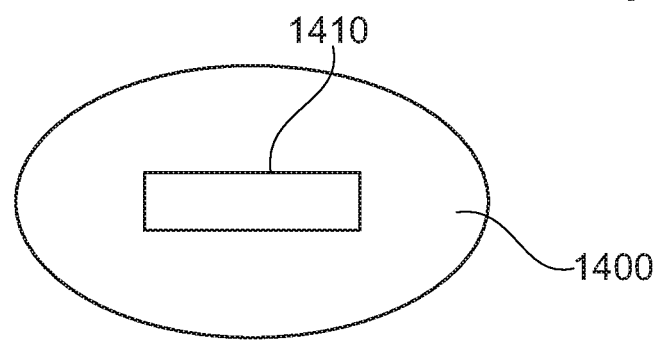
Figure 15:
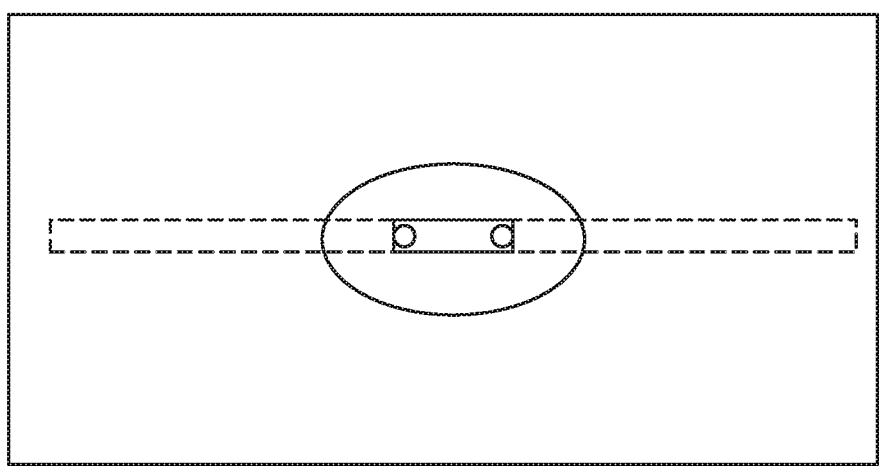

An example assembly of a microfluidic flow control will now be described with reference to FIGS. 10-12.

Figure 10:
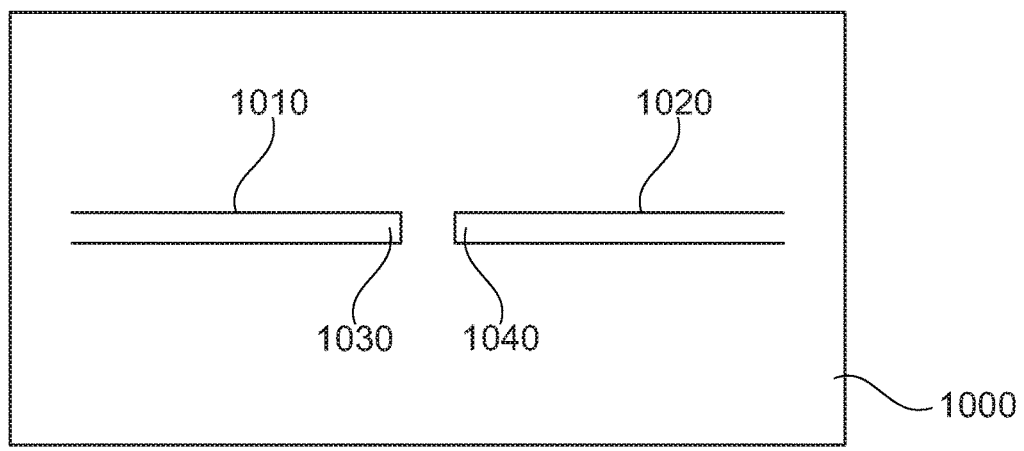
FIGS. 10 11 and 12 schematically illustrate the formation of a flow controller by joining a substrate to a flexible layer.

FIG. 10 is a schematic plan view of a substrate 1000 having substrate channels 1010, 1020 with channel ends 1030, 1040. FIG. 11 is a schematic plan view of a flexible layer 1050 having substantially the same size as the surface of the substrate and having a flexible fluid channel 1060 formed as an elongate indentation in a face of the flexible layer 1050 which will abut the face of the substrate 1000 in which the channel ends 1030, 1040 are provided. Features such as chamfering and control structures are not shown in these FIGS. 10-12 for clarity of the diagrams. Referring to FIG. 12, the flexible layer 1050 is positioned over and, in at least example embodiments, bonded to the substrate 1000 so that the flexible fluid channel provides (at least when an external force is not applied) a fluid communication path between the channel ends 1030, 1040.

FIGS. 13A, 13B, 14 and 15 provide a similar arrangement, but in this example the flexible layer 1400 (having a flexible fluid channel 1410) has a smaller size than the surface of the substrate 1000. The flexible layer 1400 is at least large enough to encompass the size of the flexible fluid channel 1410 but instead of covering the entirety (or substantially the entirety) of an active area of the substrate 1000, it forms a patch on the surface of the substrate 1000. This arrangement is particularly suited to a microfluidic device in which the channels in the substrate are normally covered (which is to say, they are closed channels) below the surface of the substrate, at least in regions not covered by the flexible layer or patch. The channels 1310, 1320 can, for example, be linked to the surface by vias 1330, 1340 as drawn. Another example of the use of vias in this way is given in FIGS. 18 and 19 discussed below.

Figure 16:
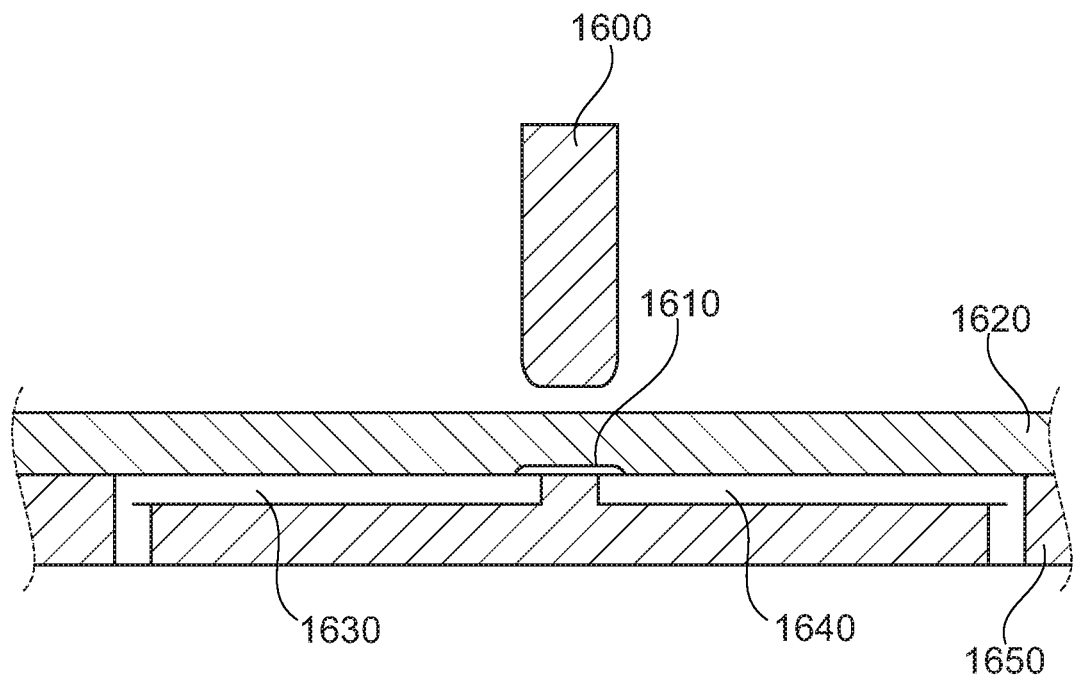
FIGS. 16 and 17 schematically illustrate the operation of a flow controller.
Figure 17:
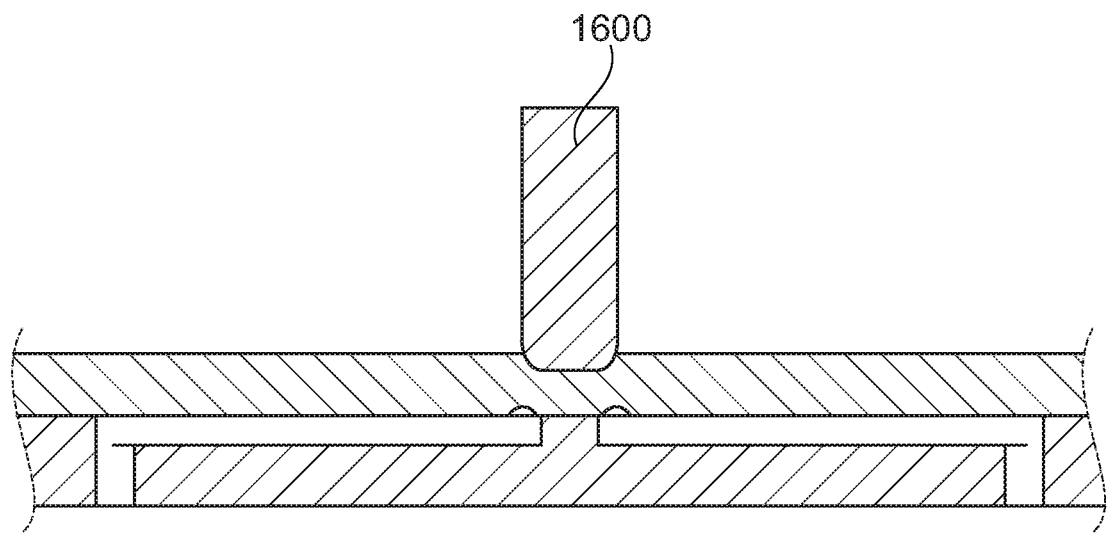

FIGS. 16 and 17 schematically illustrate the operation of a flow controller of the type discussed above. Here, a mechanical actuator 1600 is movable between a retracted position (FIG. 16) and a forwarded or deployed position (FIG. 17). A flexible fluid channel 1610 in a flexible layer 1620 is deformed by the movement of the actuator into the forwarded position so as to allow or block the flow of fluid along channels 1630, 1640 (one of which may be an inlet channel and the other an outlet channel) in a substrate 1650 of the microfluidic flow controller.

Figure 18:
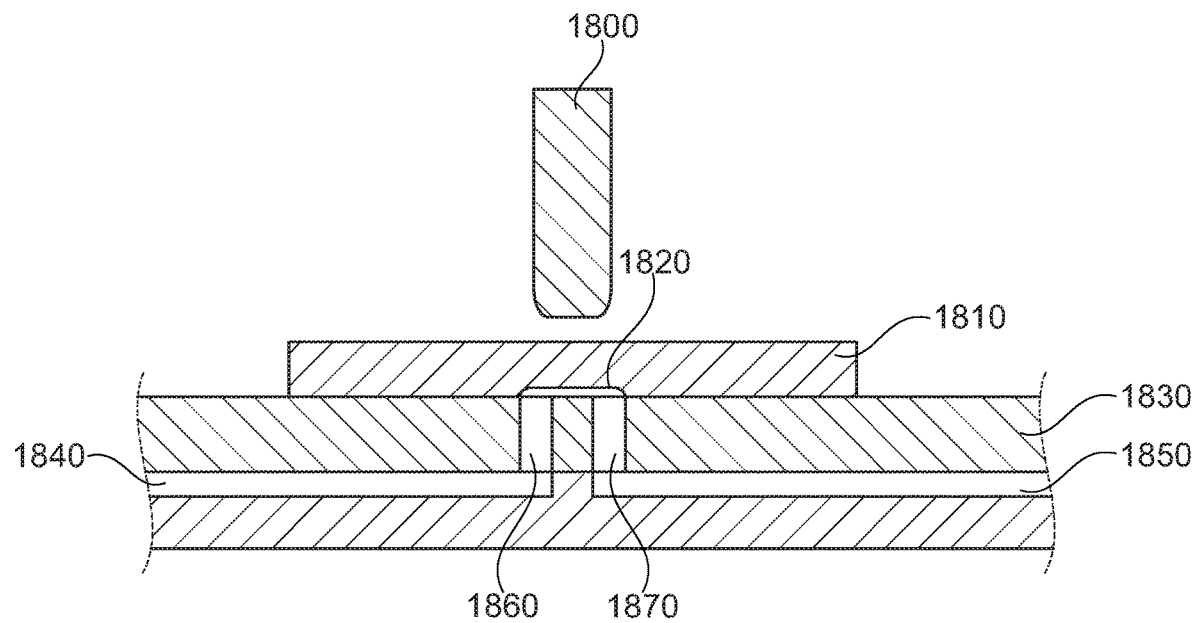
FIGS. 18 and 19 schematically illustrate the operation of another example of a flow controller.
Figure 19:
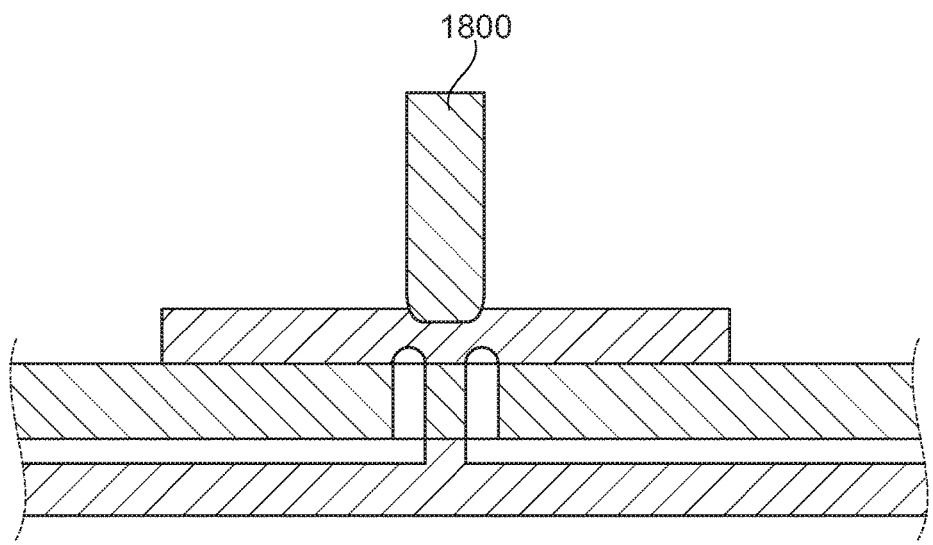

A similar arrangement is shown in FIGS. 18 and 19. Again, a mechanical actuator 1800 is used. An example flexible layer 1810 forms a patch rather than a complete layer covering the whole substrate and the flexible fluid channel 1820 is formed in a surface of the flexible layer 1810 adjacent to an upper layer 1830 of the substrate. Fluid channels 1840, 1850 are provided within the substrate (not at the surface of the substrate structure) and so-called vias 1860, 1870 are provided to link the channels 1840, 1850 to the upper surface 1830 of the substrate structure where they link with the flexible fluid channel for operation of the flow controller. This provides an example of a microfluidic flow controller in which at least one of the channel fluid ports is the end of a via which connects that channel fluid port to a respective substrate fluid channel below a surface of the substrate.

Figure 20:
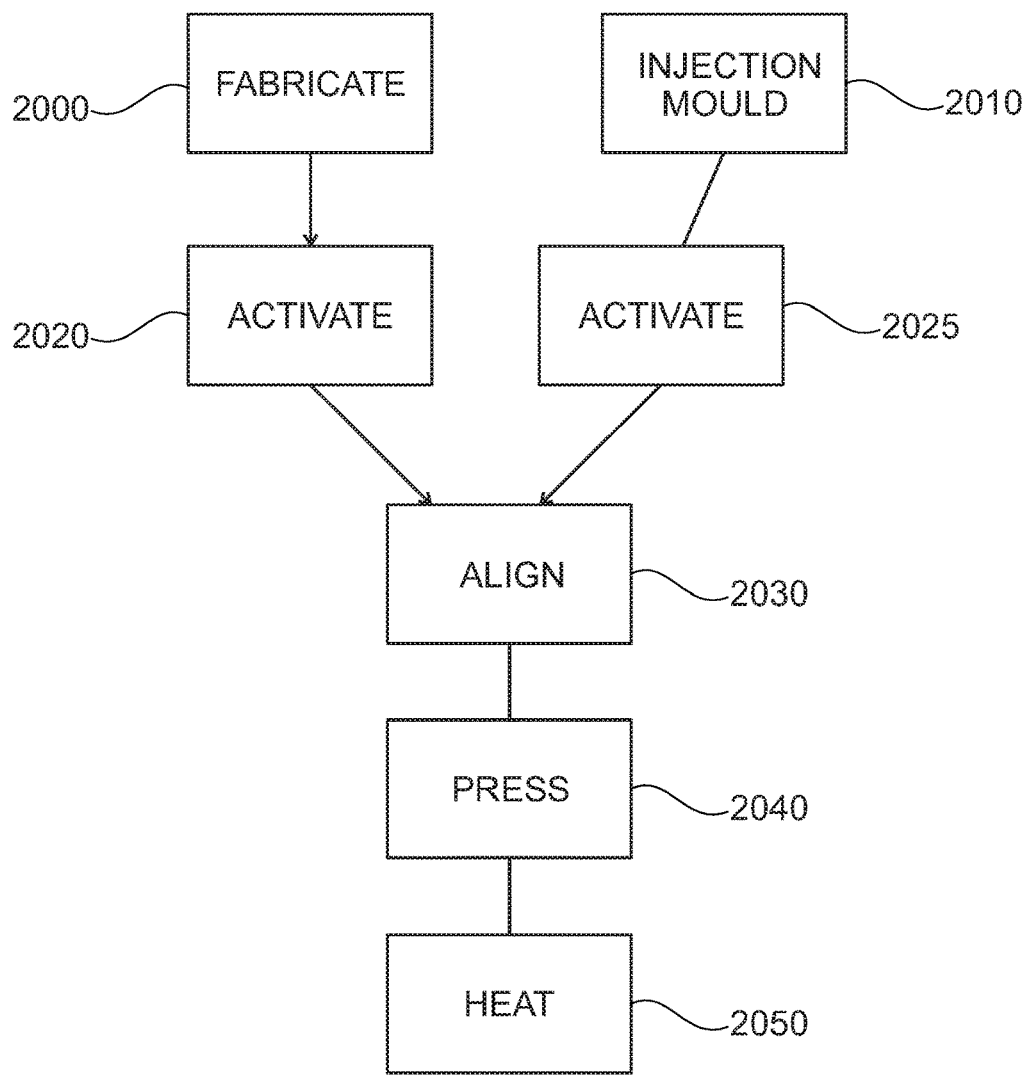
FIG. 20 is a schematic flowchart illustrating the fabrication of a flow controller and/or a microfluidic device.

FIG. 20 is a schematic flow chart illustrating the fabrication of a flow controller and/or a microfluidic device.

At a step 2000, a substrate or substrate structure is fabricated including microfluidic channels and possibly other microfluidic components or features. For example, an existing etching, stamping or embossing process can be used. At a step 2010, a flexible layer is fabricated, using injection moulding as an example.

At a step 2020 the surface of the substrate (to which the flexible layer will be bonded) is activated. Optionally the bonding surface of the flexible layer can also be activated at a step 2025. Examples of activation techniques include plasma activation, solvent activation, or activation by exposure to gas or ultraviolet light. Then, at a step 2030 the substrate and flexible layer are aligned with one another (for example using alignment marks or formations on them as well as an optical alignment process). At a step 2040 the two parts are pressed together and this pressure is maintained while, at a step 2050, heat is applied.

Other forms of attachment may be used instead of or in addition to the bonding described above. More generally, the flexible layer is attached to the substrate by an attachment selected from the list consisting of: (i) bonding, (ii) welding, (iii) gluing and (iv) clamping.

FIG. 20 therefore provides an example of a method of manufacturing a microfluidic flow controller, the method comprising fabricating a substrate having formations defining two or more substrate fluid channels having channel fluid ports which are open at an outer surface of the substrate, and positioning a flexible layer over the substrate, the flexible layer having formations defining a fluid channel so that, when the flexible layer is positioned over the substrate so as to cover at least the channel fluid ports, the flexible fluid channel provides a fluid communication path between the channel fluid ports but, when a force is applied to press the flexible layer towards the substrate, the flexible fluid channel deforms so as to inhibit fluid communication between the channel fluid ports.

The method may include fabricating the flexible layer by injection moulding. The method may include bonding the flexible layer to the substrate. The bonding step may comprise bonding the flexible layer to the substrate by plasma activated bonding.

Figure 21:
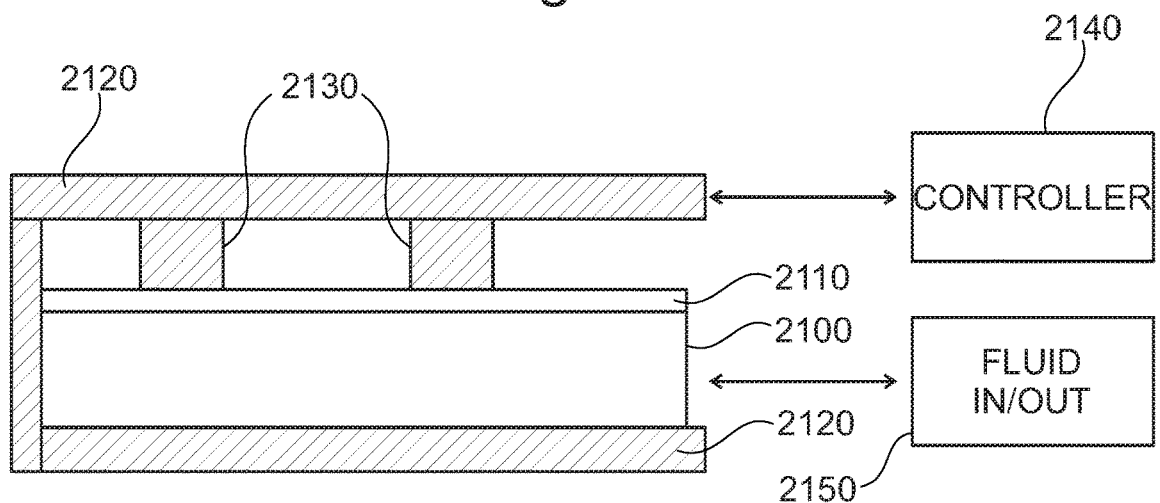

FIGS. 21-23 schematically illustrate a microfluidic system which may include a microfluidic device comprising one or more microfluidic flow controllers as discussed above. Here, a microfluidic device 2100 comprising a substrate 2160 covered with a flexible layer 2110 as discussed above (and possibly including various other microfluidic features) is mounted in a frame 2120 comprising, amongst other features, mechanical actuators 2130 to press down onto the flexible layer (for example, onto control structures on the flexible layer) to actuate the microfluidic flow controllers provided in the microfluidic device. A controller such as a computer running appropriate computer software 2140 controls operation of the device and the flow controller actuators in particular. Optionally, a fluid input/output arrangement 2150 can be provided to control the flow of fluids under test into and out of the microfluidic device. Note that the frame 2120 and other features can be reused whereas the microfluidic device can be, for example, single-use so that when that use is finished, a new microfluidic device can be inserted into the frame and actuator arrangement.

FIG. 22 shows the frame and actuators of the system of FIG. 21 without the microfluidic device in place. As mentioned, this can be used multiple times with a new microfluidic device inserted into place each time (the controller and fluid input/output are not shown in FIG. 22 or indeed in FIG. 23 for clarity of the diagram).

In other arrangements, the flexible layer 2300 including the flexible fluid channel 2310 can be provided as part of the reusable system rather than being provided as part of the microfluidic device, so that in use, a microfluidic device comprising a substrate having appropriately positioned channel formations and channel ends is placed into the frame 2120 of FIG. 23 such that the channel ends are aligned with the flexible fluid channels 2310. However, in other examples as described above, the flexible layer is provided as part of the reusable device, being bonded to the substrate or otherwise held to the substrate (for example, by clips or a frame) at manufacture. This reduces the need for such precise alignment and sealing of the flexible fluid channel to the substrate at the point of use.

FIGS. 21-23 therefore provide examples of a microfluidic system comprising: a support to receive a microfluidic device as discussed above, and one or more actuators configured with respect to the position which the microfluidic device would adopt when held by the support, so as to provide pressure to press the flexible layer of the microfluidic device towards the substrate of the microfluidic device so as to deform the flexible fluid channel defined by the flexible layer.

The system may include the microfluidic device. The device may be a disposable/single-use device.

In arrangements discussed so far, the flexible fluid channel provides a fluid path between channel ends of the microfluidic channels in the substrate. In other examples the linkage can take place part way along one or both of the channels so that the channel fluid port need not be at the end of a channel. Such an arrangement or alternative configuration is illustrated schematically in FIG. 24A where two microfluidic channels in a substrate 2410, 2420 are controllably linked by a flexible fluid channel 2430 at a point which is not a channel end on one or both of the channels. The channels can be open to the surface or can provide a via or port to the surface 2440 of the substrate (FIG. 24B). FIG. 24C schematically illustrates an arrangement whereby a channel 2450 below the surface of the substrate is linked to the surface (to form a channel fluid port) by a via 2460 as described earlier. The channel 2450 is a blind T-shaped channel.

In other examples, the flexible fluid channel can provide a controllable fluid communication linkage between more than two channels. Or in other examples, the flexible fluid channel can provide a linkage between a channel in the substrate and, for example, a waste or exhaust port.

Example suitable materials for use as the substrate and for use as the flexible layer are discussed below.

Any elastomeric material can be used, as long it fulfils all related requirements for the dedicated application. Examples include elastomer, silicone, or natural or synthetic rubber. Depending on the material, the manufacturing process for the elastomeric layer could be casting (curing/hardening by time, temperature, light, . . . ), injection moulding (e.g. for TPEs) or reactive injection moulding (e.g. for polyurethanes). Examples include a thermoplastic elastomer (TPE) such as thermoplastic polyolefine (TPO), thermoplastic vulcanisate (TPV), thermoplastic rubber (TPR), styrene based thermoplastic (TPS), amide based thermoplastic (TPA), ester based thermoplastic (TPC), urethane based thermoplastic (TPU), any kind of silicone such as polymethylsiloxane or any kind of natural or synthetic rubber such as NBR, FKM, EPDM, SEBS or the like.

The substrate may be formed of, for example, one or more of: a polymeric material, a material selected from glass, quartz, silicon nitride, and silicon oxide; polyolefines; polyethers; polyesters; polyamides; polyimides; polyvinylchlorides; and polyacrylates; including their modifications, derivatives and copolymers. More specifically (by way of example), the substrate may be formed of one from the list containing: acrylnitril-butadien-styrole (ABS), cyclo-olefin-polymers and copolymers (COC/COP), polymethylene-methacrylate (PMMA), polycarbonate (PC), polystyrole (PS), polypropylene (PP), polyvinylchloride (PVC), polyamide (PA), polyethylene (PE), polyethylene-terephthalate (PET), polytetrafluor-ethylene (PTFE), polyoxymethylene (POM), thermoplastic elastomers (TPE), thermoplastic polyurethane (TPU), polyimide (PI), polyether-ether-ketone (PEEK), polylactic acid (PLA), polymethylpentene (PMP).

FIGS. 25 and 26 are photographs of an example flow controller in use.

In FIG. 25, the steps in the flow controller closing and then opening are indicated, with a lighter coloured channel region 2500 indicating an open channel, and a darker coloured region indicating a closed channel.

FIG. 26 is a microscopic view of a device formed in transparent material, and shows two substrate channels 2600, two vials 2610 connecting the channels to the flexible fluid channel, and droplet flow between the vials 2620.

Example arrangements can provide an advantageously low dead volume and can, in at least some examples, keep the same channel cross section along the length of a valve or fluid flow controller. These features can help to alleviate the uncontrollable behaviour of fluids with dead volumes, the risk of releasing air bubbles from dead volumes, and unintended changes in fluidic flow. Dead volume can be reduced or avoided because the flexible fluid channel is directly in the flow path and (in some examples) is smaller than the inlet and outlet channel fluid ports.

The use of a rigid substrate and a flexible layer providing some of the flow controlling functionality allow high precision parts of the microfluidic device to be formed in rigid material and only the actuating part of the flow controller to be formed in the flexible material which may be lessdifficult to mould, demould and shape.

It will be apparent that numerous modifications and variations of the present disclosure are possible in light of the above teachings. It is therefore to be understood that within the scope of the appended claims, the technology may be practiced otherwise than as specifically described herein.

What is claimed is:

1. A microfluidic flow controller consisting of:
a substrate having formations defining two or more substrate fluid channels having channel fluid ports which are open at an outer surface of the substrate; and
a flexible layer having
formations defining a flexible fluid channel, that is formed as one or more indentations or recesses in the flexible layer which, when the flexible layer is positioned over the substrate so as to cover at least the channel fluid ports, the flexible fluid channel provides a fluid communication path between the channel fluid ports; and
one or more control formations protruding from the upper surface of the flexible layer providing an activation area which is directly accessible for an external actuator and has a greater width than the flexible fluid channel, wherein the one or more control formations are positioned with respect to the flexible fluid channel so that when a force is applied to the activation area of the one or more control formations, the flexible fluid channel is deformed so as to inhibit fluid communication between the channel fluid ports.

2. A microfluidic flow controller according to claim 1, in which the flexible layer has substantially the same size as the surface of the substrate.

3. A microfluidic flow controller according to claim 1, in which the flexible layer comprises a patch having a smaller size than that of the surface of the substrate.

4. A microfluidic flow controller according to claim 1, in which the one or more indentations and/or at least one of the channel fluid ports are chamfered.

5. A microfluidic flow controller according to claim 1, in which at least one of the channel fluid ports is the end of a via which connects that channel fluid port to a respective substrate fluid channel below a surface of the substrate.

6. A microfluidic flow controller according to claim 1, in which at least one of the channels is open to the substrate surface.

7. A microfluidic flow controller according to claim 6, in which at least one channel fluid port is an end of the respective channel.

8. A microfluidic flow controller according to claim 1, in which the flexible layer is formed of elastomer, silicone or natural or synthetic rubber.

9. A microfluidic flow controller according to claim 1, in which the substrate is formed of one or more of: a polymeric material, glass, quartz, silicon nitride, silicon oxide, polyethers, polyesters, polyamides, polyimides, polyvinylchlorides, polyacrylates, their modifications, derivatives and copolymers.

10. A microfluidic flow controller according to claim 9, in which the substrate is formed of one of the list consisting of acrylnitril-butadien-styrole (ABS), cyclo-olefin-polymers and copolymers (COC/COP), Polymethylene-methacrylate (PMMA), Polycarbonate (PC), Polystyrole (PS), Polypropylene (PP), Polyvinylchloride (PVC), Polyamide (PA), Polyethylene (PE), Polyethylene-terephthalate (PET), Polytetrafluor-ethylene (PTFE), Polyoxymethylene (POM), Thermoplastic elastomers (TPE), thermoplastic polyurethane (TPU), Polyimide (PI), Polyether-ether-ketone (PEEK), Polylactic acid (PLA), and polymethylpentene (PMP).

11. A microfluidic flow controller according to claim 1, in which the flexible layer is attached to the substrate by an attachment selected from the list consisting of: (i) bonding, (ii) welding, (iii) gluing and (iv) clamping.

12. A microfluidic flow controller according to claim 1, in which a cross-sectional dimension of the flexible fluid channel is selected from the list consisting of: (i) less than 1 mm; (ii) less than 500 µm; (iii) less than 200 µm; and (iv) less than 50 µm.

13. A microfluidic device comprising one or more microfluidic flow controllers according to claim 1.

14. A microfluidic system comprising:
a support to receive a microfluidic device according to claim 13; and
one or more actuators configured with respect to the position which the microfluidic device would adopt when held by the support, to provide pressure to press the flexible layer of the microfluidic device towards the substrate of the microfluidic device so as to deform the flexible fluid channel defined by the flexible layer.

15. A microfluidic system according to claim 14, comprising:
a microfluidic device according to claim 13.

16. A method of manufacturing a microfluidic flow controller,
the method comprising:
fabricating a substrate having formations defining two or more substrate fluid channels having channel fluid ports which are open at an outer surface of the substrate; and
positioning a flexible layer over the substrate, the flexible layer having formations defining a flexible fluid channel that is formed as one or more indentations or recesses in the flexible layer so that, when the flexible layer is positioned over the substrate so as to cover at least the channel fluid ports, the flexible fluid channel provides a fluid communication path between the channel fluid ports; and
one or more control formations protruding from the upper surface of the flexible layer providing an activation area which is directly accessible for an external actuator and has a greater width than the flexible fluid channel, wherein the one or more control formations are positioned with respect to the flexible fluid channel so that when a force is applied to the activation area of the one or more control formations, the flexible fluid channel is deformed.

17. A method according to claim 16, comprising:
fabricating the flexible layer by injection moulding or casting.

18. A method according to claim 16, comprising:
attaching the flexible layer to the substrate by an attachment selected from the list consisting of: (i) bonding, (ii) welding, (iii) gluing and (iv) clamping.

19. A method according to claim 18, in which the bonding step comprises bonding the flexible layer to the substrate by plasma activated bonding.

\* \* \* \* \*